W. V. JOHNSON.
MINE CAR WHEEL.
APPLICATION FILED NOV. 22, 1915.
1,183,985.                                         Patented May 23, 1916.
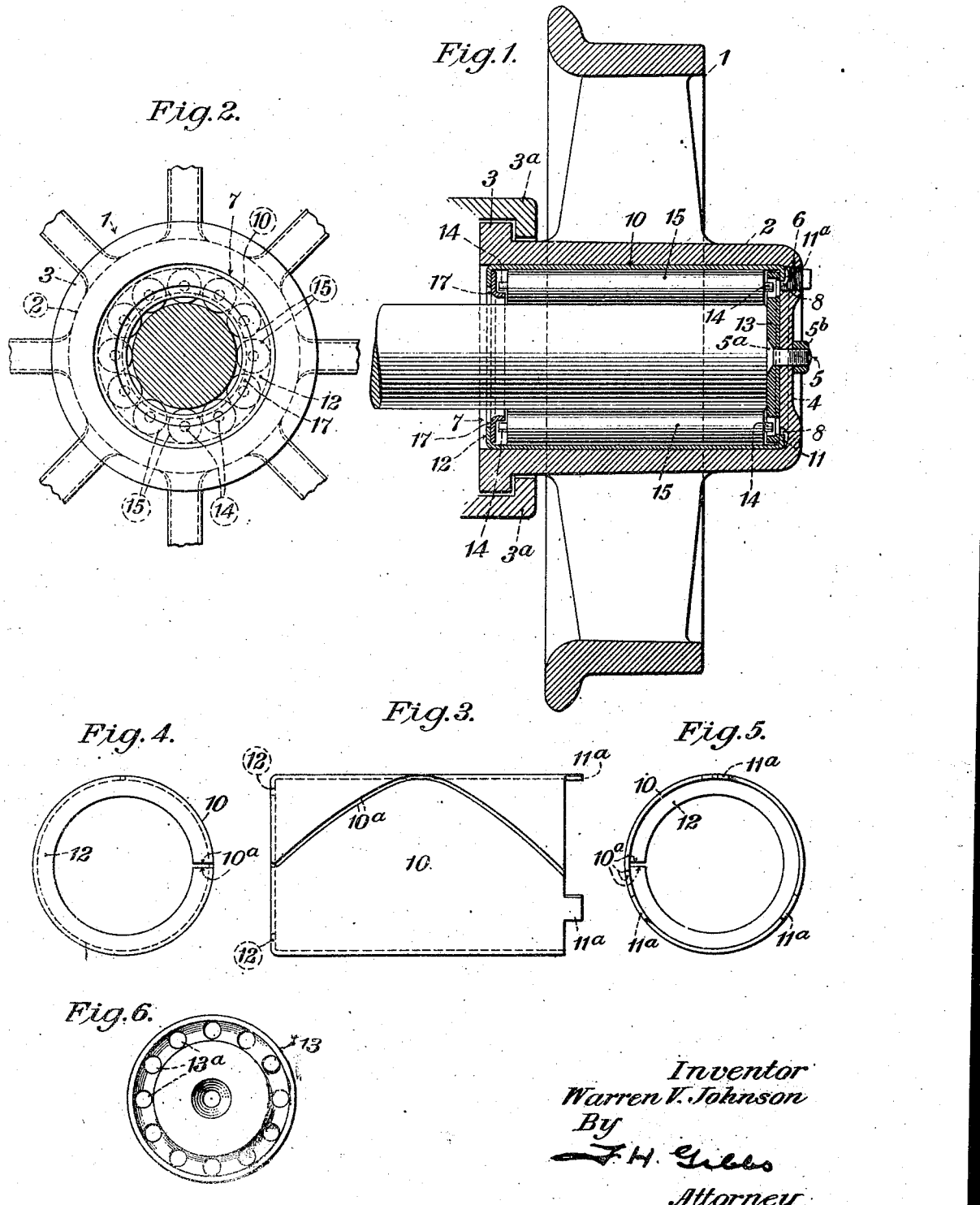
Inventor
Warren V. Johnson
By
F. H. Gibbs
Attorney

UNITED STATES PATENT OFFICE.

WARREN V. JOHNSON, OF BLOOMSBURG, PENNSYLVANIA, ASSIGNOR TO AMERICAN CAR AND FOUNDRY COMPANY, OF ST. LOUIS, MISSOURI, A CORPORATION OF NEW JERSEY.

MINE-CAR WHEEL.

1,183,985.   Specification of Letters Patent.   Patented May 23, 1916.

Application filed November 22, 1915. Serial No. 62,878.

*To all whom it may concern:*

Be it known that I, WARREN V. JOHNSON, residing at Bloomsburg, Pennsylvania, and being a citizen of the United States, have invented certain new and useful Improvements in Mine-Car Wheels, of which the following is a full, clear, and exact description, such as will enable others skilled in the art to which it appertains to make and to use the same, reference being had to the accompanying drawings, which illustrate the preferred form of the invention, though it is to be understood that the invention is not limited to the exact details of construction shown and described, as it is obvious that various modifications thereof will occur to persons skilled in the art.

In said drawings: Figure 1 is a central transverse vertical section through the improved wheel showing the roller-bearing assembly in place. Fig. 2 is a fragmentary rear elevation of the central or hub portion of the wheel. Fig. 3 is a side elevation of the sleeve of the roller-bearing assembly. Fig. 4 is an elevational view of the left-hand end of the sleeve shown in Fig. 3. Fig. 5 is an elevational view of the opposite end of said sleeve, and Fig. 6 is a detailed elevational view of the end-bearing member.

This invention relates to new and useful improvements in roller bearing wheels intended for use with mine cars and comprises certain features of novelty, all as hereinafter more fully set forth and specifically pointed out in the claims.

One of the advantages of the invention is that it provides a roller bearing for wheels of the class described, which roller bearing is self-contained and which may be assembled and, when assembled, be placed in the wheel hub with the rollers so held that they may be movable, not only with relation to the wheel hub but also with relation to the means employed for retaining the rollers in position in the hub.

Heretofore it has been the general practice to equip roller bearing wheels with rollers which are either held at their ends in annular rings, the rollers being rotatable in their bearings, but relatively fixed in their positions in said rings, or the rollers have been inserted in the wheel and depend upon either annular bearings or individual bearings for the rollers, which bearings are either formed with the wheel or are removable independently of the rollers.

It is desirable to employ rollers which are free to revolve on their axes and also free to revolve around the axle or shaft of the car or other vehicle while in operation, and to that end the roller bearing of the present invention has been designed and associated with, in the present instance, a mine car wheel, though it is evident that the roller bearing features are adaptable not only to mine car wheels but to bearings of any suitable type where roller bearings may be useful.

Referring to the parts, 1 indicates generally the wheel, 2 the hub of the wheel, 3 an annular outstanding flange on the inner end of the wheel, which flange in a mine car would either interlock with or rest in contiguity to a journal box, portions of which are shown at 3$^a$.

4 indicates what is hereinafter referred to as the closed end of the wheel hub, which closed end is centrally perforated for the passage therethrough of the locking bolt 5, the purpose of which will be hereinafter described, and also perforated and screw threaded, as shown at 6, to provide an opening through which oil or other lubricant may be inserted when desired, it being understood that the opening 6 may be closed by a plug or other suitable filler 6$^a$ when desired.

The interior of the hub 2 is of substantially uniform diameter through the bored portion 7 thereof and terminates in the annular lubricant channel 8, which communicates with the oil openings 6 before referred to.

The roller bearing assembly comprises the sleeve 10, provided at its ends with the inturned flanges 11 and 12 respectively when the parts are assembled for use. Either of the flanges 11 or 12 may be considered a permanent flange, and the other may be considered for the purpose of the present invention a temporary flange, the distinction being arbitrary, at the will of the person forming the assembly. Coöperating with the sleeve 10 and its flange 1 is an end bearing member 13, which provides a bearing not only for the outer reduced ends 14 of the rollers 15, but also provides a bearing for the end of an axle, which axle bears centrally at its end on the enlarged head 5$^a$ of the locking bolt 5, as best shown in Fig. 1 of the drawings. The inner flange 12 is provided to secure in position the annular flanged bearing collar 17 which serves to retain the inner reduced ends 14 of the rollers 15 in position, said collar 17 being retained in operative position by said inturned flange 12 when the parts are assembled for use.

The wheel having been cast and bored as indicated, and the roller bearing assembly secured in operative relation, the locking bolt 5 is projected through the end bearing member 13, after which the roller bearing assembly, including the sleeve and bearing member, rollers and collar 17, is slipped into the wheel hub with the locking bolt 5 projected through the opening provided therefor in the closed end of the hub, after which the nut 5<sup>b</sup> is secured in position and the roller bearing assembly is securely locked in position within the hub of the wheel in such manner that it is readily removable, and the rollers 15 may rotate on their axes while rolling about within the sleeve 10, under the influence of the axle. It is to be noted that the perforations 13<sup>a</sup> in the member 13 are provided as lubricant conduits through which lubricant may pass to the rollers.

If for any reason repairs are necessary to the roller bearing assembly, the wheel may be slipped off from the axle, the nut 5<sup>b</sup> removed, and the whole roller bearing assembly may be removed from the interior of the wheel hub as a unit. Should it be found that sleeve 10 were expanded so as to be temporarily locked in position within the wheel hub, the oil opening 6 may be utilized as a passage through which a driving tool can be inserted to force the roller bearing assembly from the wheel, and it is evident that one or more of such openings 6 may be annularly disposed, should it be found necessary.

The sleeve 10 is in its details of special formation. In the present example in which the flange 12 is a permanent flange and the flange 11 is formed discontinuous, i. e. in the form of a plurality of lugs 11<sup>a</sup>, extending beyond the body portion of said sleeve 10, it is best shown in Figs. 3 and 5. It is evident that the lugs 11<sup>a</sup> may be readily straightened out when it may be necessary or desirable to remove the end bearing member from the sleeve 10, and the metal of the sleeve 10 is of such character that said lugs 11<sup>a</sup> may be bent without breaking for this purpose. To prevent the lodgment of the rollers in their travel, the metal forming the sleeve 10 is so cut that when it is shaped the meeting edges 10<sup>a</sup> will be more or less curved or angular with relation to the longitudinal axis of said sleeve.

What I claim is:

1. In combination, a closed hub wheel, a sleeve therein flanged at each end, a roller-retaining annulus held in position near one end of said sleeve by flanges thereon, rollers, and roller positioning means at the opposite end of said sleeve adapted to retain said sleeve in said hub.

2. In combination, a flanged sleeve, a roller-positioning annulus held in juxtaposition to flanges on said sleeve, rollers, a roller-positioning member interlocking with other flanges on said sleeve, a closed end wheel hub and means connecting the closed end of said hub and said member.

3. In combination, a roller bearing assembly comprising a sleeve flanged at each end, a removable roller-positioning annulus at one end and a combined roller-positioning and axle-bearing member at the opposite end, rollers and means adapted to secure said assembly in relatively fixed position.

4. In combination, a closed hub wheel, a sleeve therein flanged at one end, a roller-retaining annulus held in position near one end of said sleeve, rollers, roller positioning means at the opposite end of said sleeve and means passing through said hub and roller positioning means adapted to retain said sleeve in said hub.

5. In combination, a flanged sleeve, roller-positioning means held in juxtaposition to one end of said sleeve, rollers, a roller-positioning member interlocking with flanges on said sleeve, a closed end wheel hub connecting means extending through the closed end of said hub and said member.

6. In combination, a hub having a closed end, a roller bearing assembly comprising a sleeve flanged at one end, a removable roller-positioning member at one end and a combined roller-positioning and axle-bearing member at the opposite end of said sleeve, rollers and connecting means extending through the closed end of the hub to secure said assembly in relatively fixed position.

7. In combination, a wheel-hub closed at one end, a roller bearing assembly comprising a roller-positioning annulus, a sleeve securing said annulus in position, and a second roller positioning member and securing means therefor extending through the end of said hub adapted to lock said sleeve in said closed hub.

In witness whereof I have hereunto set my hand in the presence of two witnesses.

WARREN V. JOHNSON.

Witnesses:
RALPH R. JOHN,
MARGARET KELLY.